July 2, 1957  N. S. REYNOLDS  2,797,938
FLOATING SEAL
Filed July 2, 1953

INVENTOR.
Noel S. Reynolds
BY
ATTORNEY

United States Patent Office 2,797,938
Patented July 2, 1957

2,797,938
FLOATING SEAL

Noel S. Reynolds, St. Louis, Mo., assignor, by mesne assignments, to Federal-Mogul-Bower Bearing, Inc., Detroit, Mich., a corporation of Michigan Application July 2, 1953, Serial No. 365,702

3 Claims. (Cl. 286—5)

This invention relates to seals for relatively rotating members such as a shaft and a casing structure, and more particularly to the mounting of such a type of seal, and additionally to its construction so it is capable of a floating action, that is, being capable, in the event of eccentric action between the shaft and casing structure, to follow the shaft movement and at all times maintain sealing action with the shaft surface.

One of the objects of my invention is to produce an improved seal which can be manufactured at low cost, be easily installed and which will function efficiently at all times.

Another object is to produce an improved seal that can be easily installed with a "pressed in fit" with the casing bore surrounding the shaft.

Yet another object is to produce a "pressed fit" type of seal for mounting in a bore which is so constructed that the desired fitting in the bore can be obtained in a simple and cheap manner.

Still another object is to produce a floating seal in which the inner structure thereof, which seals with a rotating shaft, is capable of continuous sealing engagement with the shaft in the event the shaft moves eccentrically to the casing structure in which it is mounted, yet the seal is capable of maintaining firm sealing action with the casing and the seal is constructed so all eccentric movement is easily compensated for in a simple manner.

A further object is to produce an improved floating seal in which the sealing lip is prevented from receiving eccentric wear by the action of a bearing ring associated with the lip.

Another and very important object is to produce a floating seal in which the rubber (or like material) sealing lip will have associated therewith a bearing member to prevent undesirable eccentric wear on the lip, and the materials will have such coefficients of expansion and will be so connected to each other that one's expansion and contraction will compensate for the other's under various temperature conditions existing during both rotation and non-rotation of a shaft being sealed.

Other objects of the invention will become apparent from the following description taken in connection with the accompanying drawings in which.

Figure 1:
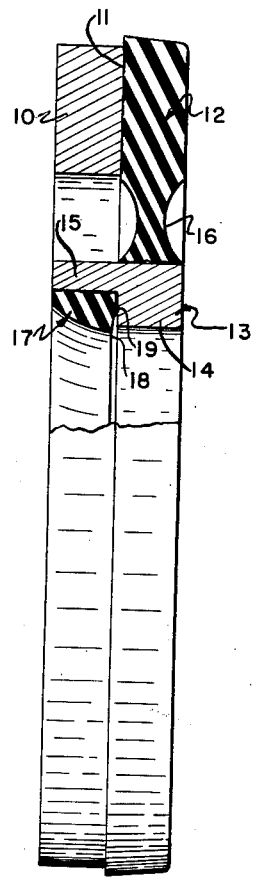
Figure 1 is a cross sectional view of a seal showing structure embodying my invention, both as to the "press in" feature and the floating feature.

Referring to the drawings in detail, my improved seal, shown by way of example only as embodying my invention, comprises first a support ring 10 which can be made of cold rolled steel or other suitable material. This ring has some thickness and radial width and, as shown, the latter can be approximately twice the former, although these dimensions could readily vary from those shown without departing from the principles of the invention embodied in the seal.

Figure 2:
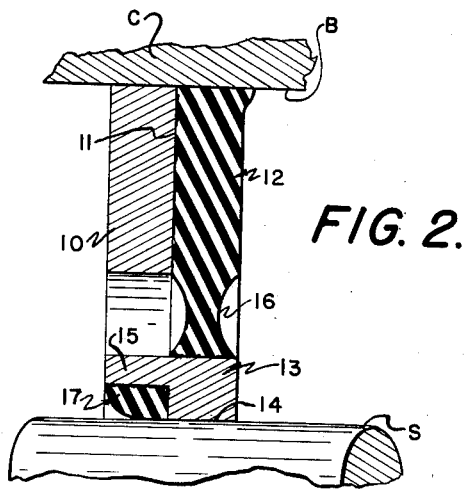
Figure 2 is a cross sectional view of part of the seal showing it mounted in operative position between a shaft and a bore in a casing structure.

To one side 11 of this support ring, is bonded an annular member 12 of resilient flexible material such as rubber or synthetic rubber. I prefer to use a relatively soft readily flexed rubber stock capable of "flow." The thickness of the member 12 can be approximately the same as the support ring, although these relative dimensions can be varied. The outer peripheral surface of member 12 is preferably slightly tapered, as for example, at an angle of 5 degrees with the axis of the seal. The taper is such that the greatest diameter is on the side bonded to the support ring and this diameter exceeds the diameter of the support ring, which in turn is of slightly less diameter than the bore B of the support or casing C in which the seal is to fit, all as shown in Figure 2. The purpose of this relationship between the support ring and the rubber member 12 is to give to the seal an easy "press in" fit into the bore B and a good sealing action between the seal and bore while at the same time keep the possibility of the rubber material from taking a "set" negligible.

The annular rubber member 12 extends radially inwardly from the support ring and is bonded to a bearing ring 13 of general L-shaped cross section. One leg 14 of the bearing ring, which is radially inward of the rubber member 12, has an inner surface adapted to ride on and have bearing engagement with the shaft S with which the seal cooperates to form a sealing action between the casing C and said shaft, all as illustrated in Figure 2. The other leg 15 of the bearing ring extends axially from the leg 14 and is of less internal diameter to thus produce an annular pocket, as clearly shown in Figures 1 and 2.

The rubber annular member 12 between the support ring and the bearing ring has a reduced thickness indicated at 16 and formed by annular relief grooves on each side. This reduced thickness provides for extreme flexibility in the form of a relatively thin web and thus permits the bearing ring to move quite easily in an eccentric manner with respect to the main body of the rubber member 12 and the support ring. Thus, the bearing ring which rides quite snugly on the shaft can easily follow the eccentric movement of the shaft with respect to the bore of casing C without causing wear on the sealing lip of the seal to be referred to.

In the pocket formed by the legs 14 and 15 of the bearing ring of the seal, I mount a sealing ring 17 of rubber or other suitable flexible or resilient material. This sealing ring is bonded to the inner surface of leg 15 and partially to the leg 14 adjacent to its juncture of leg 15. The sealing ring is provided with a sealing lip or ridge 18 which is of less diameter than the bearing surface provided by the leg 14. In this way the lip projects radially inwardly beyond the bearing surface. From the sealing lip the sealing ring is tapered toward the leg 15, thus providing the lip with a relatively flexible ridge.

I desired to have very little, if any, of the sealing ring secured to the leg 14 which is to run on the shaft. One way I accomplish this is to perform a trimming step after the sealing ring is moulded in a bonded condition in the bearing ring. This trimming is accomplished by cutting the sealing ring so as to establish the sealing lip 18 and also free the leg from the sealing rim. The trimming will give to the sealing ring a surface adjacent the side of leg 14 which is at a small angle thereto and indicated by the numeral 19.

The rubber stock material of which I prefer to construct the sealing ring 17 will be harder than the rubber stock material of the annular rubber member 12 acting as a web in the seal. The rubber in the sealing ring 17 will also have embodied therein some suitable lubricating material. With this type of rubber sealing ring there will be good sealing action at the lip and also good wearing characteristics, yet the lip will be sufficiently flexible.

The seal just described will be easily mounted in a casing bore B and have its sealing lip and the bearing ring cooperating with the shaft S as illustrated in Figure 2. The seal can be pressed into the bore as the tapered surface and the relatively soft rubber material will permit this. When the seal is mounted, the rubber at the outer tapered surface will be caused to flow and assume the condition shown in Figure 2.

If the shaft S has eccentric movement with respect to the bore B, the bearing ring will take the eccentric thrust and carry with it the sealing ring and its lip. The lip, since its sealing edge is of slightly smaller diameter than the outer diameter of the shaft, will be pushed back into the body of rubber of the sealing ring and there will be a flow of rubber with the ring taking a cross sectional shape similar to that shown in Figure 2. The flowing of the rubber assures that the sealing lip will have pressure engagement with the shaft, which will remain quite uniform due to the fact that the bearing ring takes the eccentric thrust and causes the sealing lip to move eccentrically with the shaft. The reduced section 16 of the rubber member 12 will aid in permitting the bearing ring to quite freely follow any eccentric movement of the shaft.

One particular feature of my described seal resides in the sealing ring 17 and the bearing ring. It is known that shrinkage of rubber is greater than most metals. Thus, when bearing rings of metal and sealing rings of rubber are associated together, a seal may function efficiently when a shaft is running, but when relative movement of sealed parts ceases and a cooling takes place, the efficiency is lost and leaking can occur. This results from the rubber material of the sealing ring shrinking away from the member engaged, such as a shaft surface and also the contracting of the shaft.

With my improved seal construction, I control this just referred to undesirable condition by having a relatively small amount of rubber in the rubber sealing ring and additionally back this rubber sealing ring up by the metal of the bearing ring, such being the leg 15. I further prefer to use in the bearing ring a metal material having a relatively high expansion, such as bronze. Thus, when cooling takes place, the rubber in the sealing ring, due to its small volume, will have a minimum shrinkage and this will be compensated for by the contraction of the metal of the bearing ring which surrounds the sealing ring and its lip. Thus, an efficient sealing action can be maintained with the shaft either during running of the shaft or when it is stopped and cooled off.

The trim angle 19 of the sealing ring and the fact that the sealing ring is substantially free of any adherence with the side surface of the leg 14 of the bearing ring is also important to the efficiency of the seal. The trim angle allows the lip edge portion to flex in toward the bearing ring surface and also radially away from the shaft. Also, the lack of adherence will not let the expansion and contraction of the leg part 14 of the bearing ring cause a like movement of the side of the rubber sealing ring.

I have disclosed a single seal having embodied therein my invention. This is by way of example only and I, therefore, desire it to be understood that still other seal structures can be made without departing from the fundamental principles of the invention. The novel structure embodying the "press in" feature can be employed on various types of seals besides the particular floating seal structure shown and the latter can also be embodied in seals which may not have the shown "press in" structure. I therefore do not intend that the scope of the invention is to be limited, except in accordance with the appended claims.

What is claimed is:

1. An oil seal for use between a cylindrical bore and a shaft rotating generally concentrically to said bore but subject to some eccentric motion, comprising the combination of: a radially extending metal ring with an outer cylindrical periphery that fits non-rotatively in said bore, a radial side face, and an inner periphery; an elastomeric ring bonded to said radial face along the full area thereof, having an outer periphery snugly in engagement with said bore, parallel radial faces, extending radially inwardly beyond said inner periphery of said metal ring to an axially extending inner face, and having a thinned flexing portion; an annular metal bearing member having an outer cylindrical face bonded to said axially extending inner face of the elastomeric ring and a stepped inner surface providing a generally rectangular recess at one end with an axial face and a radial face leading in to an inner bearing periphery in guiding engagement with said shaft; and an annular sealing member for said shaft comprising an elastomeric member bonded to said axial face of the bearing member nad diverging away radially inwardly from said radial face of the bearing member and having a sealing lip lying radially inwardly beyond said inner bearing periphery, whereby said sealing member can be compressed partly into said bearing member recess, the compression forcing part of the sealing member against the radial face from which it diverges, and whereby when said shaft rotates eccentrically, said bearing member keeps said sealing member truly aligned on said shaft while said thinned flexing portion accommodates the eccentric movement.

2. The oil seal of claim 1 wherein said outer periphery of said elastomeric ring is generally conical with the greatest diameter lying adjacent said metal ring, the smallest diameter being at the opposite end of the outer periphery of said elastomeric ring to constitute a pilot for locating the seal in said bore, whereby snug engagement is assured in said bore, especially immediately adjacent said cylindrical outer periphery of the metal ring.

3. An oil seal for use between a cylindrical bore and a shaft rotating generally concentrically to said bore but subject to some eccentric motion, comprising the combination of: a radially extending metal ring with an outer cylindrical periphery that fits non-rotatively in said bore, a radial side face, and an inner periphery; an elastomeric ring bonded to said radial face along the full area thereof, having an outer periphery snugly in engagement with said bore, parallel radial faces, extending radially inwardly beyond said inner periphery of said metal ring to an axially extending inner face, and having a thinned flexing portion formed by a pair of opposite annular grooves extending in toward each other from each of its radial faces; an annular metal bearing member having an outer cylindrical face substantially the axial length of both said metal ring and said elastomeric ring with one end portion thereof bonded to said axially extending inner face of the elastomeric ring and a stepped inner surface providing an inner bearing periphery radially in line with said elastomeric ring in guiding engagement with said shaft and a generally rectangular recess at the opposite end offset from said elastometric ring with an axial face and a radial face leading in to said inner bearing periphery; and an annular sealing member for said shaft comprising an elastomeric member of harder rubber than said elastomeric ring and offset therefrom in said recess being bonded to said axial face of the bearing member and diverging away radially inwardly from said radial face of the bearing member and having a sealing lip lying radially inwardly beyond said inner bearing periphery, whereby said sealing member can be compressed partly into said bearing member recess, the compression forcing part of the sealing member against the radial face from which it diverges, and whereby when said shaft rotates eccentrically, said bearing member keeps said sealing member truly aligned on said shaft while said thinned flexing portion accommodates the eccentric movement.

References Cited in the file of this patent

UNITED STATES PATENTS

| | | |
|---|---|---|
| 2,188,854 | Chievitz | Jan. 30, 1940 |
| 2,208,482 | Victor | July 16, 1940 |
| 2,358,536 | Reynolds | Sept. 19, 1944 |
| 2,385,941 | Reynolds | Oct. 2, 1945 |
| 2,434,686 | Clayton-Wright | Jan. 20, 1948 |
| 2,467,210 | Helfrecht | Apr. 12, 1949 |
| 2,482,029 | Reynolds | Sept. 13, 1949 |
| 2,698,194 | Becker | Dec. 28, 1954 |

FOREIGN PATENTS

| | | |
|---|---|---|
| 556,441 | Great Britain | Oct. 5, 1943 |
| 621,526 | Great Britain | Apr. 11, 1949 |